(12) United States Patent
Müller

(10) Patent No.: US 6,216,331 B1
(45) Date of Patent: Apr. 17, 2001

(54) METHOD FOR INSTALLING A FASTENER

(75) Inventor: Rudolf R. M. Müller, Frankfurt (DE)

(73) Assignee: Profil Verbindungstechnik GmbH & Co. KG, Friedrichsdorf (DE)

( * ) Notice: Subject to any disclaimer, the term of this patent is extended or adjusted under 35 U.S.C. 154(b) by 0 days.

(21) Appl. No.: 09/318,647

(22) Filed: May 12, 1999

Related U.S. Application Data

(62) Division of application No. 08/475,622, filed on Jun. 7, 1995, now Pat. No. 5,974,660.

(30) Foreign Application Priority Data

Jun. 10, 1994 (DE) ................................................. 44 20 426
Aug. 22, 1994 (DE) ................................................. 44 29 737

(51) Int. Cl.$^7$ ..................................................... B23P 19/02
(52) U.S. Cl. .............................................................. 29/525
(58) Field of Search ............................... 29/823, 809, 798, 29/525; 221/224; 227/119, 149; 294/2

(56) References Cited

U.S. PATENT DOCUMENTS

| 1,506,788 | * | 9/1924 | Stimpson | 227/116 |
| 4,002,265 | * | 1/1977 | Dixon | 221/278 |
| 4,698,905 | * | 10/1987 | Taga | 29/798 |
| 5,123,158 | * | 6/1992 | Dixon | 29/809 |
| 5,172,467 | * | 12/1992 | Muller | 29/798 |

FOREIGN PATENT DOCUMENTS

| 3820898 | * | 11/1989 | (DE) | 29/798 |
| 93022081 | * | 11/1989 | (WO) | 29/798 |

* cited by examiner

Primary Examiner—S. Thomas Hughes
Assistant Examiner—Jermie E. Cozart
(74) Attorney, Agent, or Firm—Howard & Howard

(57) ABSTRACT

A setting head for the installation of fastener elements having a head and shaft into a pre-apertured workpiece. The setting head has at least three holding fingers, with each holding finger initially centering, aligning, and positioning the element in the setting direction, both at the head and also at a distance from the head along the shaft.

1 Claim, 2 Drawing Sheets

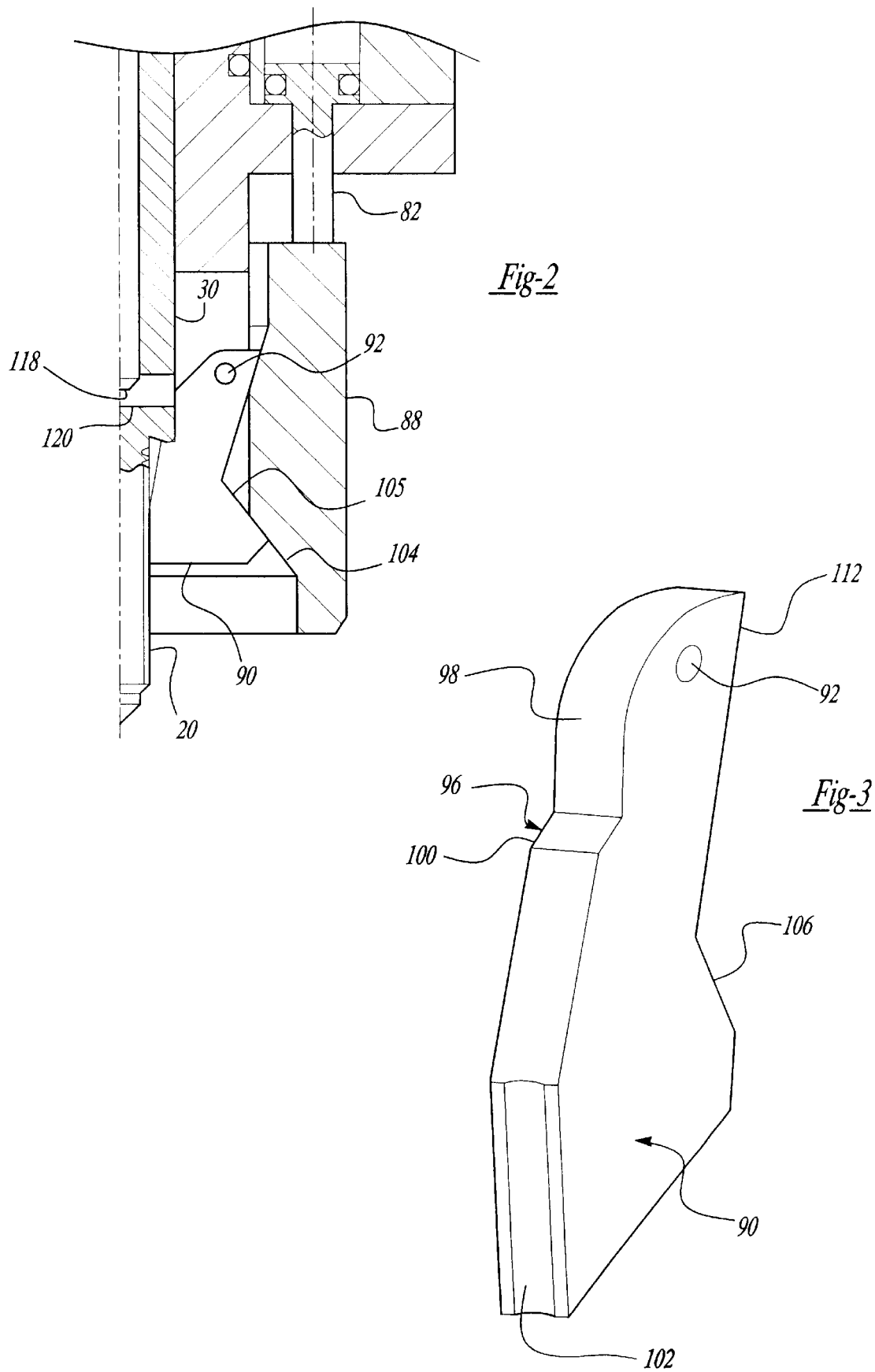

METHOD FOR INSTALLING A FASTENER

This application is a divisional application of U.S. Ser. No. 08/475,622; filed Jun. 7, 1995 now U.S. Pat. No. 5,974,660.

BACKGROUND

The present invention relates to a setting head and to a method for the insertion of elements consisting of head and shaft parts into pre-apertured workpieces, and is concerned, above all, but not exclusively, with the insertion of bolt elements into sheet metal parts, with the bolt elements being secured to the sheet metal parts via a riveted connection. Such rivetable bolt elements are known and can be classified into two different categories depending on whether the riveted connection arises in the region of the transition between the shaft and the head part or at the end face of the head facing away from the shaft part.

The present invention is concerned principally with the setting of bolt elements of the first named category in which the riveted connection arises in the region of the transition between the shaft part and the head part. However, it can be modified so that it can be used for bolts of the second category. The setting head is however in principle also suitable for the introduction or for the setting of hollow fastener elements such as rivetable nuts, above all when these have an elongated shape.

An example for a modern rivetable bolt which can be inserted into a sheet metal part or into a plate part by means of the setting head of the invention, or by means of the method of the invention, can be found in the German patent application P 44 20 475.8 of the present Applicants filed on Mar. 25, 1994. The element which is claimed there and which can be inserted into a sheet metal part comprises a shaft part and a unitary head part formed thereon and is characterized in that the element has concave peripherally closed fields or pockets at its underside serving as the contact surface, with the fields or pockets being partly bounded by ribs which extend outwardly away from the shaft part. The shaft side ends of the ribs extend in raised form along the shaft part and merge at their ends remote from the head part into at least one recess which is spirally arranged around the shaft part. During the setting process the metal of the sheet metal part is deformed into the fields and into the recess. This results in a form-fitted connection between the element and the sheet metal part. In this way, not only a rotational security of the element is present but also a connection which prevents the loss of the element from the sheet metal part prior to and during the mounting of the counter-element which has to be secured by the element to the sheet metal part.

Setting heads for the insertion of fastener elements onto bolt elements are likewise known and are frequently inserted into presses in order to rivet the fastening elements with sheet metal parts during the manufacture or shaping of the sheet metal parts.

By way of example a setting head can be found in DE-PS 34 47 006 which is suitable for the insertion of bolt elements which are riveted to the sheet metal part at the end face of the head facing away from the shaft part. In this respect the threaded part of the bolt is received over its full length within a bore of the plunger so that a high quality alignment of the bolt element is ensured as a result of the excellent mechanical guidance of the plunger.

The problem of ensuring a precise alignment of the bolt element within the setting head and during the insertion of the bolt element exists above all with bolt elements which are riveted to sheet metal parts in the region of the transition between the shaft part and the underside of the bolt head.

SUMMARY OF THE INVENTION

The object of the present invention is thus to provide a setting head for the insertion of fastener elements, principally, but not however exclusively. This invention is particularly adapted for bolt elements which are riveted to a sheet metal part in the region of the transition between the shaft part and the head. An excellent alignment of the fastener element prior to and during the setting process is ensured with a simple inexpensive compact manner of construction and problem-free operation, and indeed an alignment which is not impaired by machine vibrations or jolts.

In order to satisfy this object provision, the invention teaches that the respective element to be inserted can be held in the setting head by at least three holding fingers. Each holding finger initially centers, aligns and positions the element in the setting direction both at the head part and also at a distance from the head along the shaft part.

The corresponding method for the insertion of the element is accordingly characterized in that the elements are introduced between at least three holding fingers. The fingers respectively hold the element initially both at the head part and also at a spacing from it at the shaft part so that it is centered, aligned and positioned in the setting direction. During subsequent closing movement of the setting head, the holding fingers still hold the respective element during the initial introduction of the shaft part into the aperture of the workpiece, which is aligned above a matrix or die button. The fingers only pivot. outwardly after the guidance of the shaft part has been taken on by the guide bore of the matrix, but also guide the head part in a centered manner during this pivotal movement and during at least a part of the setting movement of the plunger, until the head part of the element contacts the workpiece or approaches the latter; and in that the element is connected in form-locked manner to the workpiece by means of the setting plunger and the matrix.

Since the respective element to be inserted is held by at least three holding fingers, both at the head part and also at an axial distance along the shaft part, it is ensured, in accordance with the invention, that the longitudinal axis of the fastener element adopts a predetermined position concentric to the setting plunger and cannot tilt. This security against tilting would for example not be generated in trouble-free manner with only two holding fingers, but could however be achieved with more holding fingers which however represent an additional mechanical complication and are actually unnecessary. The use of three holding fingers also has the advantage that adequate space is available for the introduction of the fastener element between the three holding fingers.

Since the holding fingers also hold the fastener element at the head part it is ensured that the fastener element adopts a precisely predetermined axial position along the longitudinal axis of the setting plunger, so that the working movements of the setting head or of the setting plunger and the course of the setting method can be predetermined in the most precise manner. The fastener element is however not only aligned and positioned by the holding fingers but rather also precisely centered, so that tight tolerances can be observed with respect to the positioning of the corresponding aperture of the lower lying sheet metal part. The pre-manufactured aperture of the sheet metal part can have a diameter which is only fractionally larger than the outer diameter of the shaft part of the fastener element. In this way a reliable riveted connection is achieved without having to fear that the shaft part will be damaged on introduction through the hole by the surrounding metal of the sheet metal part due to inaccuracies in positioning.

Since the way of holding the fastener elements in the setting head in accordance with the invention also precludes a tilting of the element the danger of damage to the tool or to the workpiece on insertion of the fastener element is largely precluded, so that undesired disturbances of the sequence of operation are minimized.

The movements of the pivotally arranged holding fingers are synchronized with one another in accordance with the invention which ensures that the desired centered alignment of the fastener element with the axial direction of the setting plunger is always given.

The synchronized means preferably comprises a sleeve with oblique surfaces for the control of the pivotal movement of the holding fingers during the working movement of the setting head. With this arrangement preferably yieldable pressure means are provided for biasing the sleeve in the direction towards the workpiece during the working movement of the setting head. As a result of this bias the holding fingers are biased in the direction towards the fastener element, and this biasing is brought about with an adequately high force in order to ensure the desired centering and alignment of the fastener elements and to overcome the force of any springs which tend to bias the holding fingers to execute a pivotal movement in a radially outward direction.

At least some of the holding fingers should preferably have a respective shoulder, with the shoulders of the holding fingers cooperating at least with the underside and preferably also with the side surface of the head part of the respective fastener element for positioning of the latter. It is particularly favorable when the shoulders have a shape similar to an involute related to the position of the respective pivot axis of the holding finger and the shape of the underside of the head part. In this way the movement of the head part of the fastener element on the shoulders of the holding fingers takes place in the manner of a roll off movement of the holding fingers so that, on the one hand, little friction arises which could hinder the movement of the fastener elements and, on the other hand, pronounced sliding movement of the head part of the respective fastener element with respect to the holding fingers is prevented, so that the occurrence of wear is minimized.

Since the shoulders also remain in contact with the head parts of the corresponding fastener elements during part of the axial movement of the fastener elements they also exert a supporting function on the respective fastener element during this part of the movement.

During this part of the movement the setting plunger moves in the direction towards the head part of the fastener element until a centering means at the end face of the plunger enters into contact with a complimentary centering aid of the respective fastener element and takes on the centered guidance and alignment of the respective fastener element, at least in part.

Another advantage of the present invention is the two-part design of the housing of the setting head which permits easy manufacture of the setting head with the simultaneous maintenance of tight tolerances.

Additionally, the preferred embodiment of the present invention, employs fluid pressure, preferably pneumatic pressure, to bias the reciprocating elements. This has proved advantageous in practice, since in this way one succeeds, with a relatively short constructional height in providing both a very compact arrangement and also a very reliably operating head. The head of this invention can be used for the placement of all conventional kinds of fastener elements piercing and/or riveting fastener elements. It can be used, for example, for the introduction of self-piercing bolts and pierce nuts or also for the introduction of bolts and nut elements or other fastener elements which only need to be connected to one or more sheet metal parts by a riveting process.

The compact design which is achieved in accordance with the invention is suitable above all for use as an integral module which can be attached via a quick change coupling to a machine part, for example to a part of a press, as disclosed in the German patent application P 43 10 953.5. The disclosure of this German patent application is herewith incorporated into the present application having regard to the quick change coupling.

The invention will be explained in more detail in the following with reference to an embodiment and to the drawing in which are shown:

BRIEF DESCRIPTION OF THE DRAWINGS

FIG. 2 is a schematic illustration similar to FIG. 1 but of a modified embodiment of the invention, with only the holding finger area of the setting head being shown, principally to the right hand side of the longitudinal axis of the setting plunger.

FIG. 3 is a perspective view of one of the fingers of the present invention.

DETAILED DESCRIPTION OF THE INVENTION

Figure 1:
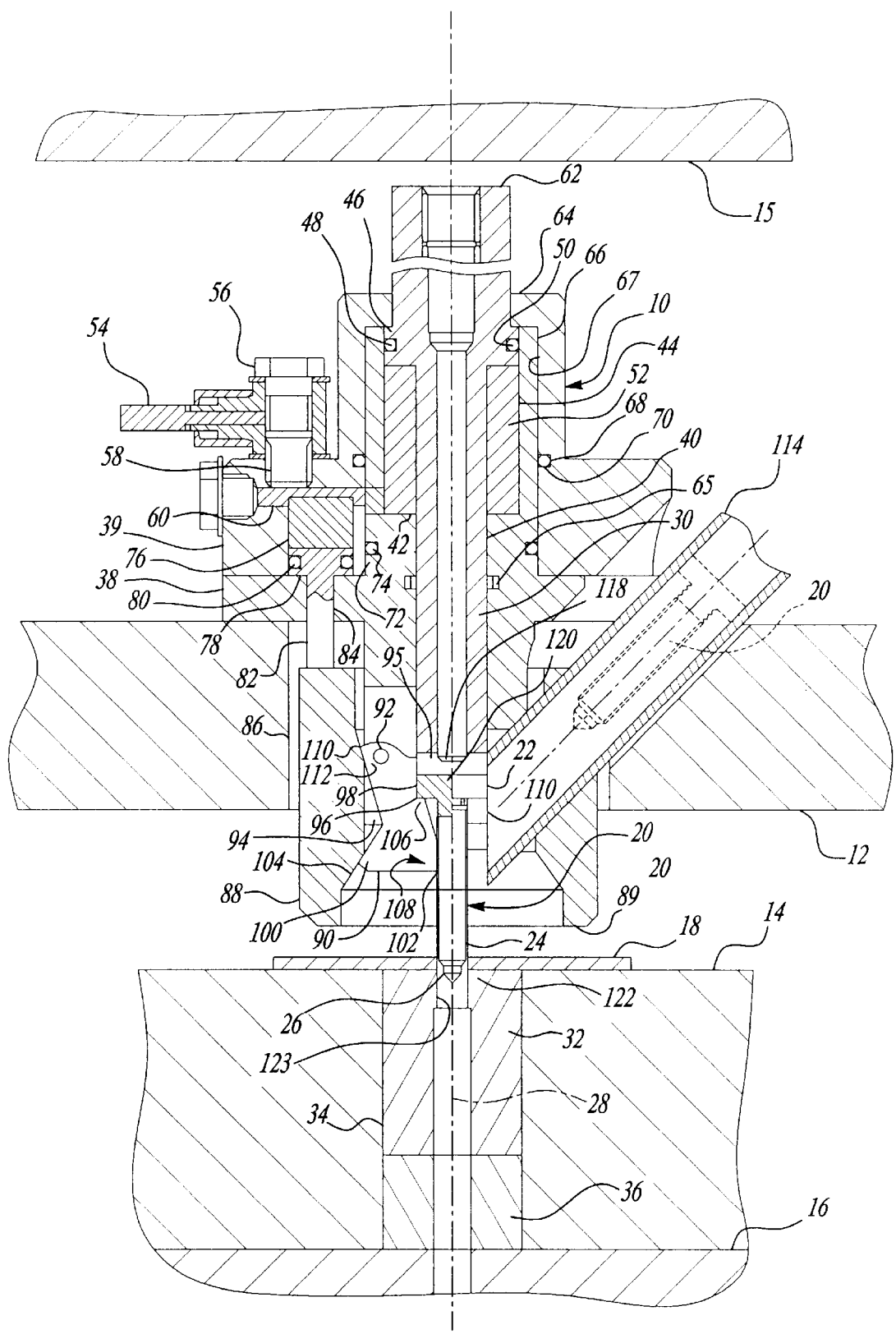
FIG. 1 is a partly sectioned illustration of setting head in accordance with the invention.

FIG. 1 shows the setting head 10 of the invention which is mounted on a spring-loaded hold down plate 12 of the tool upper part of a press (illustrated schematically by the plate 15). The spring-loaded hold down plate 12 cooperates with a tool lower part 14 which is secured to the base plate 16 of the press.

Between the spring-loaded hold down plate 12 and the lower part 14 of the tool there is located a sheet metal part 18 which, depending on the concept of the manufacturing method has either been largely shaped previously, or is to be (further) shaped between the upper part of the tool and the lower part of the tool 14.

As illustrated, the metal part has a manufactured aperture 26 for receipt of fastener element 20. The element 20 has a head part 22 and a shaft part 24 and is adapted to be riveted to the sheet metal part 18. The broken line 28 shows the longitudinal axis of the setting head 10, i.e. at the same time the setting direction. The longitudinal axis of the plunger 30 of the setting head, the longitudinal axis of the bolt element 20 and the longitudinal axis of the matrix or die button 32 which cooperates with the setting head are aligned with each other, i.e. the setting plunger 30, the bolt element 20 and the matrix 32 are coaxially aligned with one another. The matrix 32 which cooperates with the setting head is inserted into a bore 34 of the lower part of the tool and supported on a ring member 36.

The setting head comprises a two-part housing 38, 39, the two parts of which are secured to one another and to the spring-loaded hold down plate 12 by a plurality of bolts (not shown in the drawing). The lower housing part 38 of the setting head has a central cylindrical bore 40 in which the plunger 30 is displaceably journaled. The bore 40 is arranged concentric to the longitudinal axis 28 of the setting head. The bore 40 merges via a ring step 42 into a further bore 44 which has a larger diameter in comparison to the bore 40. The plunger 40 has a cylindrical lower part and is provided at its upper end with a ring flange 46 which forms a piston and cooperates with the bore 44 of larger diameter. An O-ring 48 takes care of the sealing of the flange 46 which fulfills the piston function and is accommodated in a ring groove 50 of this flange. As a result of this arrangement a ring space (piston space) 52 is formed between the lower part of the plunger and the bore 44 of larger diameter. This space 52 is charged with compressed air at a pressure of, for example, 6 to 8 bar which comes from a corresponding pressure source and is introduced via a line 54, via the connection 56, the channel 58 and a transverse bore 60 into the space 52. The pressure which prevails in the space 52 leads to the piston 46 contacting the flange part 64 of the upper housing part 40 in working states in which no force is exerted on the upper end face 62 of the plunger 30, so that this flange part 64 restricts the axial movement of the setting plunger 30 in the direction away from the lower part 14 of the tool. The reference numeral 65 refers to an O-ring seal which can be selectively inserted between the plunger 30 and the cylinder bore 40. Here the ring seal 65 is located however also be arranged in a ring groove of the plunger. When a ring seal 65 of this kind is provided then it ensures that leakage of compressed air is minimized, so that it is not necessary to dimension the source of compressed air to be oversize.

It can however also be advantageous to do away with the ring seal 65 and to permit a certain loss of compressed air along the plunger 30 within the bore 40. The compressed air used normally passes via an oiling system and thus contains a small quantity of oil which can be useful for the lubrication of the plunger.

With normal dimensioning of the plunger 30 and of the cylinder bore 40 the pressure loss is in any case relatively minimal as a result of the length of the bore, the lubrication however ensures a long working life. It is also possible, in the sense of improving the lubrication, to provide rifling in the cylinder bore 40 similar to that in a gun barrel, or to provide corresponding rifling at the outer surface of the setting plunger 30. The quantity of air which flows past the plunger is hereby increased, whereby the lubrication of the plunger is also increased. In other respects it is possible, in this manner, to blow abraded particles out of the setting head, out of the area of the fastener element or from beneath the component 88 and/or around the holding fingers, so that the cleaning intervals for the setting head can be substantially reduced. Through predetermined positions and angles of the rifling targeted air bursts can also be achieved which take care of the cleaning of the interior of the setting head.

It is evident from the drawing that the upper part 39 of the housing has a cylindrical bore 66 beneath the flange part 64 which fits over the cylindrical outer wall 67 of the upper part of the lower housing 38. A ring seal 70 accommodated in a ring groove 68 of the housing upper part 39 seals the connection surface between the housing upper part and the lower part of the housing above the transverse bore 60 and prevents compressed air from escaping in this direction.

A further ring groove 72 with a ring seal 74 is provided in the lower part 38 of the housing beneath the transverse bore 60 to prevent compressed air from escaping downwardly between the two housing parts.

In the lower flange of the top hat-shaped housing upper part 39 there are located a plurality of cylinder bores 76 arranged around the central longitudinal axis 28 of the setting head, with only one of these bores being shown in FIG. 1. Three such bores are preferably provided which are angularly uniformly distributed around the central longitudinal axis 28 of the setting head. In each of the cylinder bores 76 there is located a piston 78 with a sealing ring 80 and a downwardly directed piston rod 82. Each piston rod 82 leads through a respective guide bore 84 in the flange region of the lower housing part 38 into a chamber 86 which is formed inside the spring-loaded hold down member 12. The free ends of the piston rods, of which there are three in this example (of which any one piston rod 82 can be seen), are connected to a component 88 in the form of a sleeve or nose piece which is always biased by the action of the compressed air present in the cylinder bores 76; i.e., which is always biased in the direction towards the lower part 14 of the tool. It is evident that the cylinder bores 76 always communicate with the ring space 42 via the transverse bore 60, so that the compressed air always biases the plunger 30 upwardly and, as already indicated, the sleeve 88 downwardly.

The housing lower part 38 carries, in the lower region, three pivotally arranged holding fingers 90 of which only one is evident in FIG. 1, since the two further fingers lie outside of the plane of the section. The three holding fingers 90, which are preferably arranged at equal angular intervals around the longitudinal axis 28 of the setting head, are pivotally suspended on respective transverse pins 92 and are pivotally guided through respective longitudinal slots 94 of the lower part 38 of the housing, with the width of each slot 94 being dimensioned to be only fractionally broader than the respective holding finger 90, so that the holding fingers are pivotable but are well guided with close tolerances. The lower end of the lower part of the housing is of hollow shape in the region of the bolt element and indeed the line 95 shows the sidewall of the corresponding hollow cavity which is concentric to the axis 28.

It is evident, that the head part 22 of the bolt element 20 sits on a shoulder 96 of the holding finger 90, with the one surface 98 which defines the shoulder 96 contacting the outer side surface of the head part 22 and with the second surface 100 of the shoulder 96 being inclined obliquely downwardly and forming a wedge-shaped space with the lower side of the head part 22. As each of the three holding fingers 90 has a corresponding step 96, the bolt element 20 is positioned axially in a trouble-free manner in the longitudinal direction 28 of the setting head by the three holding fingers 90. In addition, each holding finger 90 has a preferably vertical surface 102 at its lower end which contacts the shaft part 24 of the bolt element 20, and indeed at an axial distance from the shoulder 96. Through the contact of the bolt element 20 with each holding finger at two axially spaced apart points 96, 102, and through the special nature of the arrangement of the holding fingers, as will subsequently be explained, it is ensured that the longitudinal axis of the bolt element 20 is co-axially aligned with the longitudinally axis 28 of the setting head. In other words, the bolt element 20 is held by the holding fingers 90 so that it is centered, aligned and positioned.

It is also evident from the drawing that the sleeve 88 has an inner conical ring surface 104 which diverges downwardly. This conical surface 104 cooperates with respective inclined surfaces 106 of the holding fingers 90 and in the illustrated position contacting the bolt element 20, the inclined surfaces 106 respectively lie parallel to the surface of the conical ring surface 104. As a result of the biasing of the sleeve 88 downwardly, all three holding fingers 90 are biased inwardly in the direction of the arrow 108 so that the desired contact with the bolt element arises at the surfaces 98 and 102.

Since each holding finger has the same dimensions as the other holding fingers, and since all three are pivotally suspended around identically positioned pins 92, the sleeve 88 ensures that the surfaces 98 and 102, respectively, have the same distance from the longitudinal axis 28 of the setting head, so that the bolt element 20 is arranged in a centered manner. If during the working stroke of the press the upper part of the tool (plate 15) is pressed downwardly, then the sleeve 88 abuts at its end face 89 against the sheet metal part 18 and holds this firmly against the lower part 14 of the tool. The piston rods 82 then press the respective pistons 78 upwardly into the respective cylinder bores 76 so that on further downward pressing of the upper part of the tool a further conical ring surface 110 of the sleeve 88, which is arranged axially above and spaced apart from the conical ring surface 104 and which diverges upwardly presses against a corresponding inclined surface 112 at each of the holding fingers 90 and ensures that all three holding fingers pivot outwardly with one another in a synchronized manner opposite of the direction of the arrow 108 and permit the bolt element to be pressed downwardly by the plunger 30, as will be explained subsequently in more detail.

It can further be seen from the drawing that a tubular feed channel 114 is arranged obliquely to the longitudinal axis 28 of the setting head, with the inclined end 116 of the supply channel lying on an imaginary continuation of the cylinder bore 40. The two further holding fingers which are not shown in the drawing are arranged in front of and behind the supply channel 114 relative to the plane of the drawing. In this manner, the position of the supply channel 114 does not impair the manner of operation of the holding fingers 90 and makes it possible to introduce the bolt elements 20. The bolt elements 20 are sent in a segregated manner through the supply channel 114 into the space between the two holding fingers so that they adopt the position shown in FIG. 1 under gravity, as will also be explained later in more detail.

Finally, it is evident from the drawing that the plunger 30 has a centering means in the form of the centering pin 118, which can cooperate with a centering aid 120 in the form of a recess of complementary shape in the upper end face of the head part 22 of the bolt element 20.

In this example, the matrix 32 has a nose region 122 which serves for the formation of the riveted connection between the sheet metal part 18 in the bolt element and can be formed in accordance with the above-named German Patent Application P 44 10 475.8. The formation of this nose region 122 is, however, unimportant for the functional description of the setting head.

The manner of operation of the apparatus of the invention will now be explained in more detail. It is assumed that the setting head is located in the working position, as shown in FIG. 1. This position corresponds to the position of the sprung hold down plate 12 shortly before departing from the upper dead point of the press in which the upper part 15 of the tool and the lower part 14 of the tool have the greatest distance from one another. It is also assumed that the bolt element 20 is present in the illustrated position and that the further adjacent bolt element 20 has either not yet been introduced into the supply channel or into its end piece 114 or is prevented by a separate means from moving further in the direction toward the longitudinal axis of the setting head.

Thereafter, the press closes further; i.e., the upper press plate 15 starts to move in the direction toward the base plate 116. In this way, the end face of the sleeve 88 comes into contact with the sheet metal part 18 and clamps the latter between it and the spring loaded hold down plate 12. The tip of the bolt element 20 has at this state penetrated the aperture in the sheet metal part, and the shaft part of the bolt is now guided by the central passage of the matrix which is formed as a guide 123. The diameter of the bore forming the guide 123 is in this respect only fractionally larger than the outer diameter of the shaft part 24 of the bolt element 20. During the subsequent closing movement, the upper housing part moves ever further in the direction toward the sleeve 88. During this, the pistons 78 displace air from the cylinder bores 76. the conical ring surface 10 enters into contact with the inclined surfaces 112 of the holding fingers and causes these holding fingers to pivot away from the bolt element 20 opposite to the direction of the arrow 108. During this, the bolt element 20 slowly moves lower along the inclined surface 100; i.e., the head part 22 is still supported at the shoulders 96 at least during the first outwardly directed pivotal movement of the holding fingers 90. Through the shaping of the surfaces 100 in the manner of an involute, a roll-off movement occurs at these surfaces and not a sliding movement. Thus, the head part 22 of the bolt element remains centered, although the surfaces 98 move away from the head part. The problem-free guidance and centering of the bolt element continues to be ensured, since the bolt element 20 is held at this stage on the one hand by the shoulders 96 and, on the other hand, the shaft part is guided at an axial distance from it by the bore 123 of the matrix.

In the advance stage of closing of the press after the sprung hold down plate 12 has deviated rearwardly in the direction of the upper part 15 of the tool, the upper press plate comes into contact with the end surface 62 of the plunger 30 and moves the latter downwardly so that the centering means 118 enters into the centering recess 120 of the bolt element and continues to guide the latter in axial alignment assisted by the cylindrical bore of the matrix 32. The holding fingers 90 have now pivoted radially outwardly to such an extent that the head part 22 of the bolt element 20 comes free from the shoulders 96 of the holding fingers 90 and is pressed downwardly under the force of the plunger 40, which is generated by the upper press plate and then slides past the inner flanks of the holding fingers 90 and the surfaces 102.

These flanks exert a braking action onto the head part of the bolt element 20 and prevent the bolt element from slipping away from the plunger 30. In this way, the good centering continues to be retained. If necessary, spring elements, for example, polyurethane ring springs, which are formed by customary ring seals, are inserted into corresponding ring grooves in the conical ring surface 104 of the sleeve 88, which brings about a light prestressing of the holding fingers into contact with the bolt element and thereby compensates for the unavoidable manufacturing tolerances of the bolt elements. In this way, an even better centering of the bolt element 20 in the state of FIG. 1 is also achieved in other respects in that the surfaces 98 of the holding fingers contact the head part 22.

A faulty alignment of the bolt element as it slides past the inner oblique surfaces of the holding fingers is precluded because the bolt element 20 is guided in a trouble-free manner, on the one hand in the guide bore 123 of the matrix and, on the other hand, by the centering means 118. During this further movement, the plunger 30 also closes the outlet opening 116 of the supply channel 114 so that the faulty introduction of a further bolt element is prevented. At the end of the closing movement of the press, the end face of the plunger 30 presses the head part 22 of the bolt element 20 firmly against the sheet metal part 18 while the sheet metal part 18 is simultaneously supported and deformed at the underside by the noses 122 of the matrix 32, so that the material of the sheet metal part 18 around the aperture 26 is deformed in accordance with the shape of the bolt element and riveted to the bolt element 30.

At this stage, the sleeve 88 is located at the top in contact with the lower side of the upper housing part 38 and a new bolt element 20' can be introduced into the supply channel 114. The plunger 40 prevents the new bolt element 20' from sliding on further.

The press then opens increasingly. The spring elements inserted between the spring-loaded hold down plate 12 and the upper part 15 of the tool ensure that the spring-loaded hold down plate initially remains down. The compressed air delivered via the line 54, on the one hand, presses the piston 78 and thus the sleeve 88 downwardly and the plunger 30 upwardly. The plunger 30 thereby frees the insertion opening for the supply channel 114 and the sleeve 88 pivots the pivotal fingers 90 back into the position shown in FIG. 1. It hereby synchronizes the movement of the holding fingers 90 and of the further bolt element 20', which is, for example, released from a separating device so that it slides down the supply channel 114, optionally under the action of a burst of compressed air, and slides between the holding fingers 90 which are in the act of moving into the end position of FIG. 1. In this manner, the new bolt element 20' takes the place of the bolt element 20 shown in FIG. 1. The plunger 30 finally returns into its upwardly biased position, and a further closing movement of the press can then take place by a repetition of these processes by means of which the new bolt element 20' can be rivetted to a new sheet metal part 18 (not shown) which has been introduced into the press in the meantime.

FIG. 2 shows a somewhat modified embodiment of the apparatus of FIG. 1 in which the holding fingers 90 and the sleeve 88 are formed somewhat differently inasmuch as the second conical ring surface at the sleeve and also the corresponding inclined surface of the holding fingers is missing. The pivoting of the holding fingers away out of the area of the bolt element 20, or out of the region of the plunger 30, is brought about in this example by the downwardly directed force of the plunger element 30 and can be supported by spring force, for example by springs which attempt to pivot the retaining fingers outwardly about the pins 92. The course of the pivotal movement is also determined in this example by the cooperation of the conical ring surface 104 and the corresponding inclined surface 105 of the respective holding fingers.

In this example, the centering means 118 of the plunger 30 is designed somewhat differently from that described in connection with the embodiment of FIG. 1. The centering means 118 in the embodiment of FIG. 2 is namely formed as a centering pin which is biased downwardly by a spring, with this centering pin also having a switching function and signal via a switch (not shown) to the press control that a bolt element is actually located beneath the plunger. The press control can thus be designed so that in the absence of this signal, a closing movement of the press cannot be carried out, whereby faulty operations, or the ejection of sheet metal parts without bolt elements, can be prevented.

Another modification which is possible is shown in FIG. 3. The fingers 90 are provided with a profiled shape shown generally at 102 in the contact region against the thread of the bolt element with the profiled shape being complementary to the thread. In this manner, it is ensured that the thread of the bolt element is not damaged by the holding fingers.

Although the above-explained embodiments are concerned with the guidance of bolt elements n which a riveted connection with the sheet metal part is generated in the region of the transition between the shaft part and the head part of the bolt element, these embodiments can also be used by corresponding modification of the shape of the holding fingers, for bolt elements which have to be guided with their head downwardly and riveted to the sheet metal part in the region of the end face of the head remote from the shaft part. In just the same way, the design of the holding fingers 90 can be matched to nut elements with a head part of larger diameter and a shaft part of longer dimension. In this case, the fastener elements can also be guided with the head downwardly or the head upwardly with appropriate design of the holding fingers.

What is claimed is:

1. A method for installing a fastener into a workpiece, said fastener having a head portion and an elongated body portion, said method comprising the steps of:

feeding said fastener into a plunger passage of an installation head, said installation head having a plunger reciprocally mounted within said plunger passage, at least three holding fingers pivotally mounted adjacent said plunger and control means for pivoting said holding fingers to engage and disengage said fastener;

feeding said fastener between said holding fingers;

engaging said fingers against said fastener at said head and at said elongated body of said fastener to center, align, and position said fastener;

driving said fastener toward said workpiece while simultaneously continuing to engage said fingers against said fastener until said elongated body passes through the surface of said workpiece;

pivoting said fingers away from said fastener to release said fingers from said elongated body portion while still holding said fingers against said head portion with said workpiece guiding the elongated body portion;

driving said fastener head into said workpiece and releasing said fingers from said fastener;

retracting said plunger;

said fastener head portion includes a side surface and a bottom surface, said method further including the steps of initially holding said fingers against said side surface and said bottom surface of said fastener head portion; pivoting said fingers with respect to said fastener as said head portion bottom surface begins to engage said workpiece to release said bottom portion and still engage said side portion;

said control means includes a nose piece reciprocally mounted about said plunger, said nose piece having a contoured inner surface, said fingers having a contoured outer edge juxtaposed to said contoured inner surface, and an inner edge for engaging said fastener, said method including the steps of:

reciprocating said nose piece with respect to said fingers as said plunger is driven towards said workpiece with said contoured inner surface and outer edge camming against one another to control the extent of pivotal movement of said fingers with respect to said fastener.

* * * * *